United States Patent
Satoh et al.

(10) Patent No.: US 7,334,553 B2
(45) Date of Patent: Feb. 26, 2008

(54) BALANCER DRIVEN GEAR OF ENGINE

(75) Inventors: Tomoyasu Satoh, Wako (JP); Akira Takahashi, Wako (JP); Teruo Kihara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 175 days.

(21) Appl. No.: 10/560,011

(22) PCT Filed: Sep. 22, 2004

(86) PCT No.: PCT/JP2004/013785

§ 371 (c)(1),
(2), (4) Date: Dec. 8, 2005

(87) PCT Pub. No.: WO2005/031188

PCT Pub. Date: Apr. 7, 2005

(65) Prior Publication Data

US 2007/0089699 A1 Apr. 26, 2007

(30) Foreign Application Priority Data

Sep. 26, 2003 (JP) .............................. 2003-336339

(51) Int. Cl.
*F02B 75/06* (2006.01)
*F16C 11/00* (2006.01)
(52) U.S. Cl. ..................................... 123/192.2; 74/603
(58) Field of Classification Search ............. 123/192.2, 123/192.1; 74/603
See application file for complete search history.

(56) References Cited

U.S. PATENT DOCUMENTS 6,626,139 B1 * 9/2003 Horita et al. ............ 123/192.2

FOREIGN PATENT DOCUMENTS

| JP | 60-192145 | 9/1985 |
|---|---|---|
| JP | 54365-1987 | 9/1987 |
| JP | 36523-1991 | 4/1991 |
| JP | 53668-1989 | 4/1991 |
| JP | 04-054347 | 2/1992 |
| JP | 07-071532 | 3/1995 |

* cited by examiner

*Primary Examiner*—Stephen K. Cronin
*Assistant Examiner*—Hyder Ali
(74) *Attorney, Agent, or Firm*—Carrier, Blackman & Associates, P.C.; William D. Blackman; Joseph P. Carrier

(57) ABSTRACT

A balancer driven gear of an engine, for the transfer of rotation of the crankshaft to a balancer shaft, is made up of a gear member, a bush member and elastic members and interposed therebetween. The bush member has a boss portion fixed to the balancer shaft, and a plurality of outward dowels projecting radially outward from the outer periphery of the boss portion. The gear member is disposed coaxially with the bush member. The gear member has an annular portion with gear teeth on the outer periphery thereof and a plurality of inward dowels projecting radially inward from the inner periphery of the annular portion. Elastic members are disposed between the outward dowels on the bush member 20 and the inward dowels on the gear member. The shapes and/or dimensions of the dowels positioned on opposite sides with respect to the axis of the balancer driven gear are made asymmetric.

14 Claims, 6 Drawing Sheets

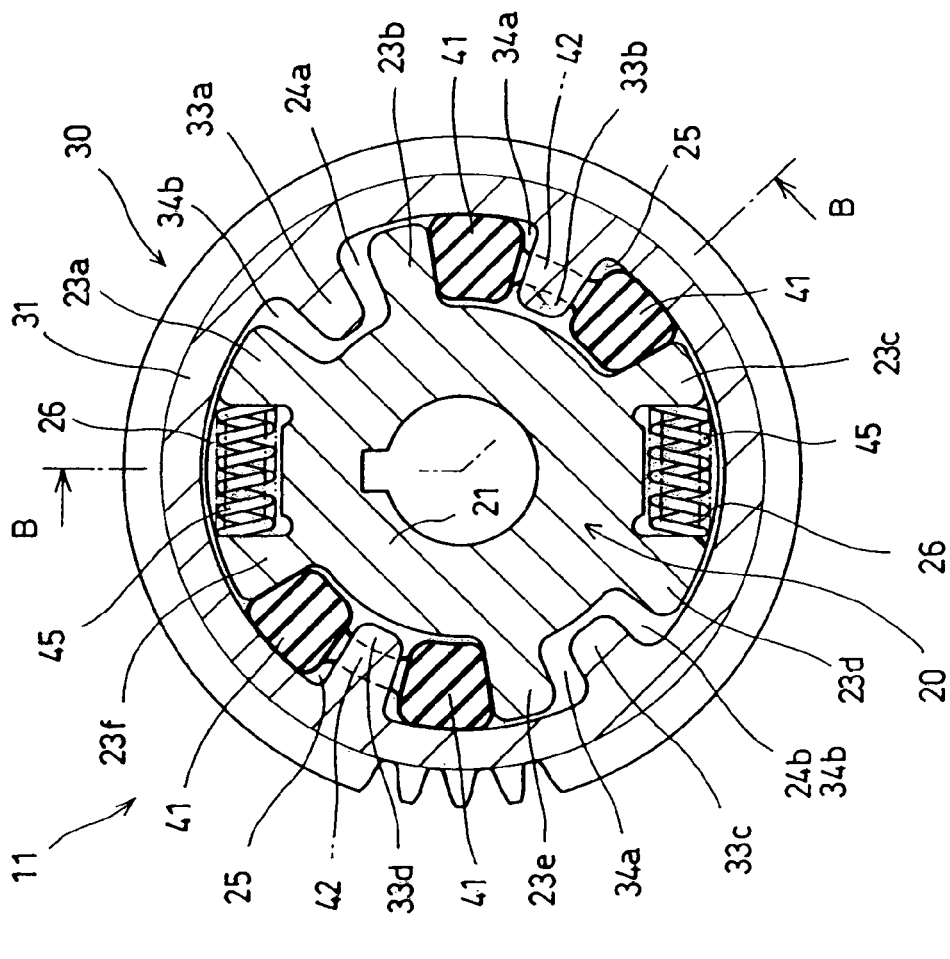
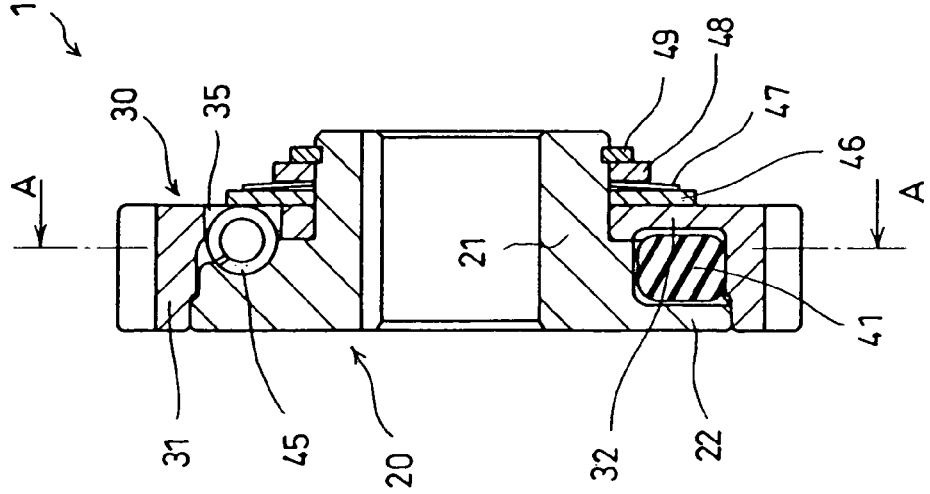
Fig.3(a)
Fig.3(b)

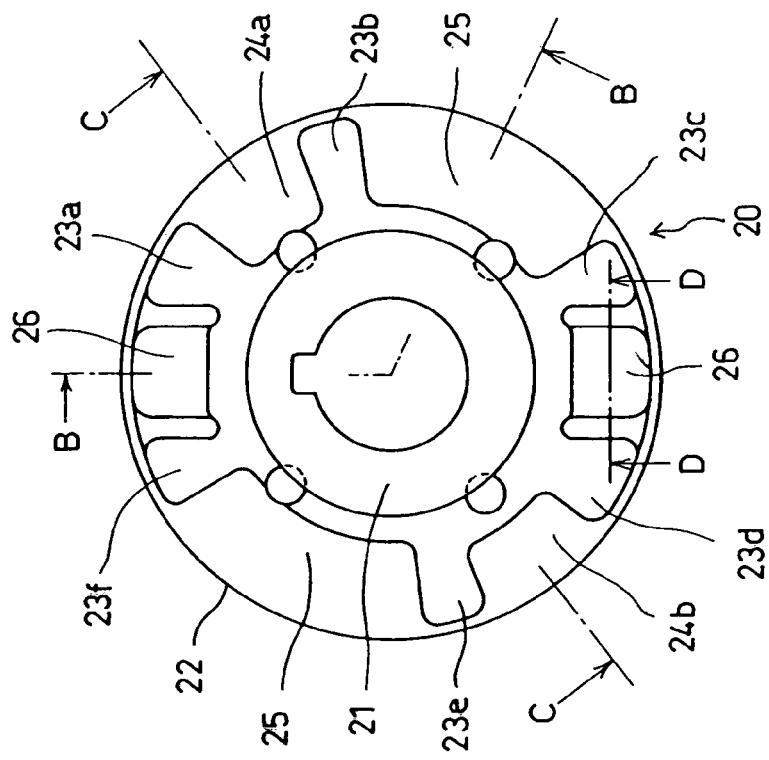
Fig.4(a)
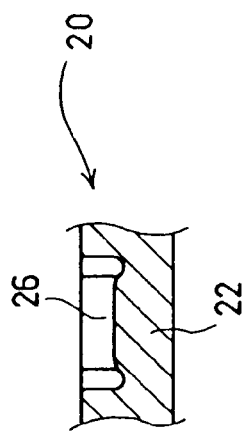
Fig.4(d)
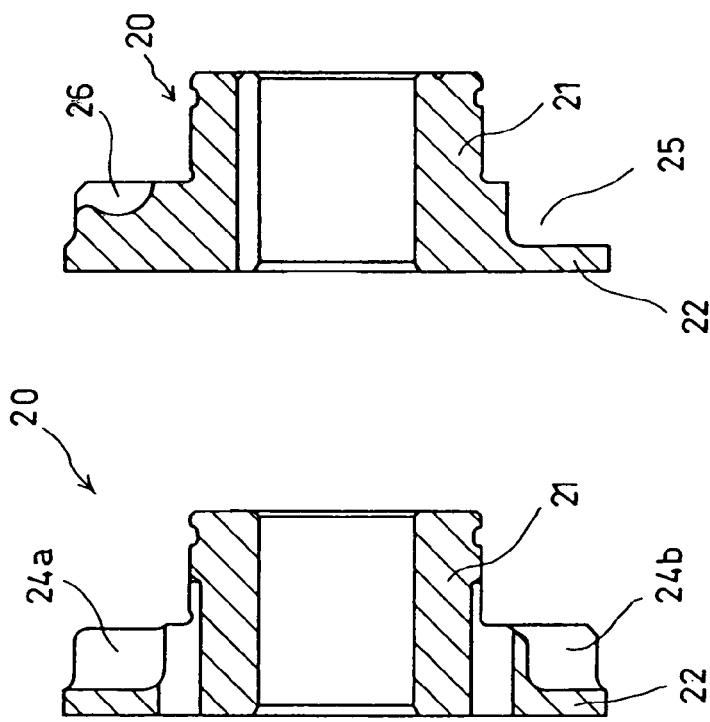
Fig.4(b)
Fig.4(c)

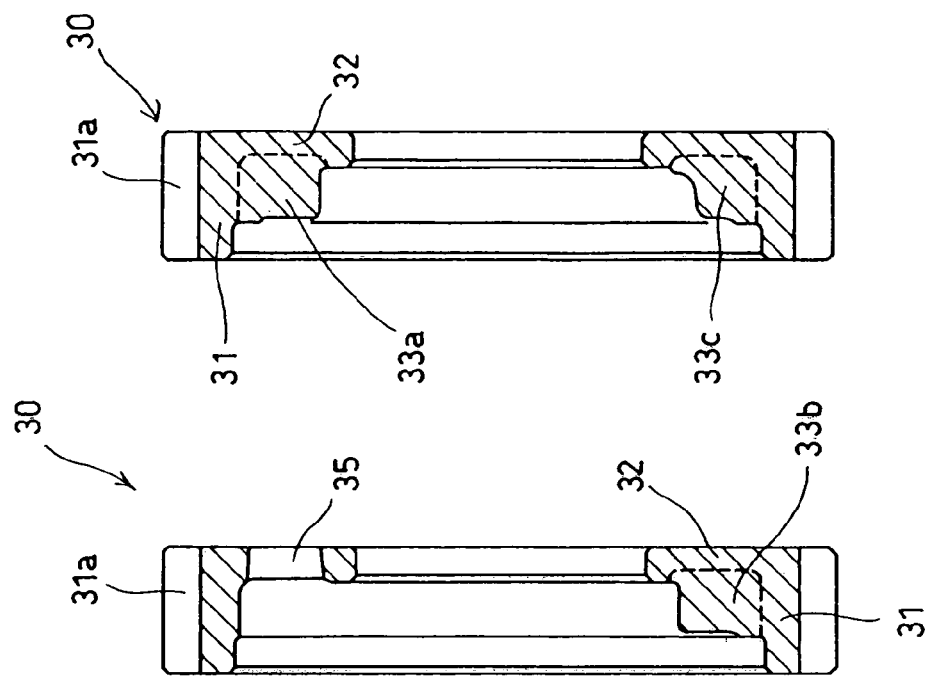
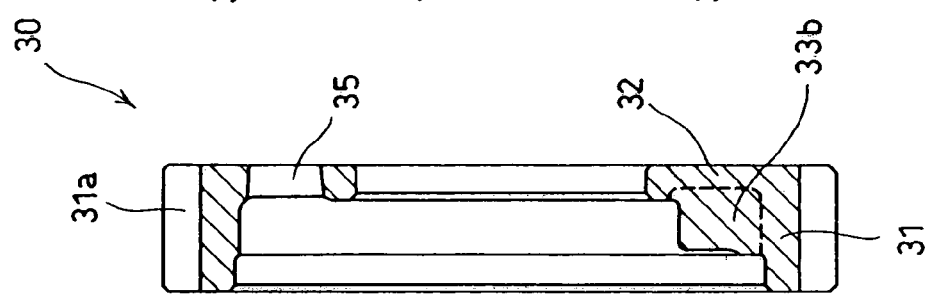
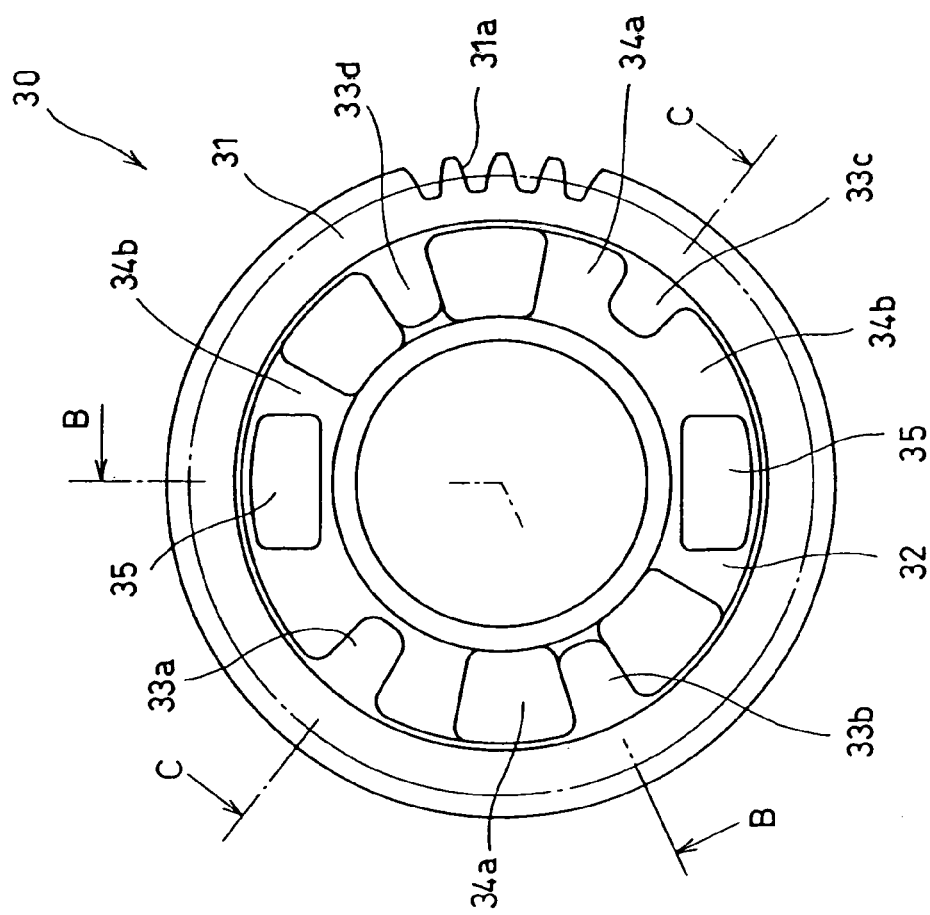

BALANCER DRIVEN GEAR OF ENGINE

TECHNICAL FIELD

The present invention relates to a balancer driven gear in a balancer device for removing imbalance in rotational inertia force during operation of a reciprocating internal combustion engine.

BACKGROUND ART

Reciprocating internal combustion engines having a balancer device are known. In such a balancer device, a balancing weight corresponding to about half of a total reciprocating mass of the reciprocating piston, the connecting rod and so on is mounted on the crankshaft. A balancing weight of the same weight is mounted on a balancer shaft. The balancer shaft is rotated at the same speed as and in a direction opposite to the crankshaft to decrease or eliminate imbalance in rotational inertia forces produced by the aforesaid total reciprocating mass during the reciprocating motion. However, when the balancer device is driven by a gear drive method, gear teeth striking noises occur due to backlash between gears in each meshed portion. Particularly during idling operation of the engine, the gear teeth striking noises become loud.

Means for preventing or reducing the gear teeth striking noises in the balancer drive system referred to above are known. In known means, a portion of gears for the transfer of rotational force from the crankshaft to the balancer shaft, is provided with elastic members, such as rubber members, interposed as dampers between the driving side and the driven side, and vibrations or the like transmitted from the crankshaft to the balancer shaft are damped to effect a smooth transfer of torque (see, for example, Patent Document 1). In this case, a measure for preventing the occurrence of an error at the time of assembling gears has been taken such as making the arrangement of the elastic members asymmetric or setting the number of gear teeth to an even number (see, for example, Patent Document 2).

[Patent Document 1]
JP 60-192145 A (FIG. 5)
[Patent Document 2]
JP 07-71532 A (FIG. 2, Reference numeral 11)

DISCLOSURE OF THE INVENTION

Underlying Problem to be Solved by the Invention

In the above conventional balancer driven gear, the arrangement of the damper structure or the setting of gear specifications is restricted, thus giving rise to the problem that the layout of the internal combustion engine is restricted in its degree of freedom.

The object of the present invention is to provide a balancer driven gear of an engine, which is free from the above problem of restriction to the degree of freedom of the engine layout.

Means for Solving the Underlying Problem

According to the present invention, for attaining the above object, there is provided a balancer driven gear of an engine comprising: a bush member having a boss portion fixed to a balancer shaft and a plurality of outward dowels projecting radially outward from an outer periphery of the boss portion; a gear member disposed coaxially with the bush member, the gear member having an annular portion with gear teeth formed on an outer periphery thereof and a plurality of inward dowels projecting radially inward from an inner periphery of the annular portion; the bush member and the gear member being assembled in such a manner that the outward and inward dowels are disposed alternately in a peripheral direction of the balancer driven gear; and elastic members provided between the outward dowels on the bush member and the inward dowels on the gear member; wherein at least one of shapes and dimensions of the outward and inward dowels are asymmetric with respect to an axis of the balancer driven gear.

EFFECT OF THE INVENTION

In the present invention constructed as described above, the bush member has the outward dowels projecting radially outward from the outer periphery of the boss portion, and the gear member has the inward dowels projecting radially inward from the inner periphery thereof. At least one of the shapes and dimensions of the outward and inward dowels is asymmetric. Therefore, when an assembling method other than a normal method is used, the tip of some dowel comes into interference with related parts. The dowel cannot be satisfactorily received in its normal position. For this reason, it is possible to carry out the assembly in the right way. Thus, the degree of freedom in the layout of the internal combustion engine is improved without being restricted by gear specifications.

BRIEF DESCRIPTION OF THE DRAWINGS

FIG. 1 is a sectional view of a principal portion of an internal combustion engine to which a balancer driven gear according to an embodiment of the present invention is applied, the principal portion being cut along a plane including a cylinder axis and intersecting a crankshaft perpendicularly.

FIG. 2 is a sectional view of the engine principal portion as cut along a plane including the crankshaft and a balancer shaft.

[FIG. 3(a)]
FIGS. 3(a) illustrates a balancer driven gear shown in FIGS. 1 and 2, being a section taken along the A-A line in FIG. 3(b).

[FIG. 3(b)]
FIGS. 3(b) is a section taken along the B-B line in FIG. 3(a).

[FIG. 4(a)]
FIGS. 4(a) is a view of a bush member as a component of the balancer driven gear, as seen axially of the bush member.

[FIG. 4(b)]
FIGS. 4(b) is a sectional view taken along the B-B line in FIG.4(a).

[FIG. 4(i c)]
FIGS. 4(c) is a sectional view taken along the C-C line in FIG. 4(a).

[FIG. 4(d)]
FIGS. 4(d) is a sectional view taken along the D-D line in FIG. 4(a).

[FIG. 5(a)]

FIGS. 5(a) is a view of a gear member as a component of the balancer driven gear, as seen axially of the gear member.

[FIG. 5(b)]

FIGS. 5(b) is a sectional view taken along the B-B line in FIG. 5(a).

[FIG. 5(c)]

FIGS. 5(c) is a sectional view taken along the C-C line in FIG. 5(a).

FIGS. 6(a) is a view of a damper rubber member as a component of the balancer driven gear, as seen axially of the damper rubber member.

FIGS. 6(b) is a sectional view taken along the B-B line in FIG. 6(a).

FIGS. 6(c) is a sectional view taken along the C-C line in FIG. 6(a).

DESCRIPTION OF REFERENCE SIGNS

1 . . . Internal combustion engine; 3 . . . Connecting rod; 4 . . . Crank shaft; 5 . . . Web; 6 . . . Crankpin; 7 . . . Balancing weight; 8 . . . Balancer shaft; 9 . . . Balancing weight; 10 . . . Balancer driving gear; 11 . . . Balancer driven gear; 20 . . . Bush member; 21 . . . Boss portion; 22 . . . Disc portion; 23a, 23b, 23c, 23d, 23e, and 23f . . . Outward dowel; 24a and 24b . . . Recess (trough); 25 and 26 . . . Recess; 30 . . . Gear member; 31 . . . Annular portion; 31a . . . Gear; 32 . . . Flange portion; 33a, 33b, 33c, and 33d . . . Inward dowel; 34a and 34b . . . Recess; 35 . . . Hole (window); 40 . . . Damper rubber member; 41 . . . Rubber block; 42 . . . Connecting portion; 45 . . . Spring damper; 46 . . . Washer; 47 . . . Conical spring washer; 48 . . . Washer; 49 . . . C-shaped retaining ring.

BEST MODES FOR CARRYING OUT THE INVENTION

Figure 1:
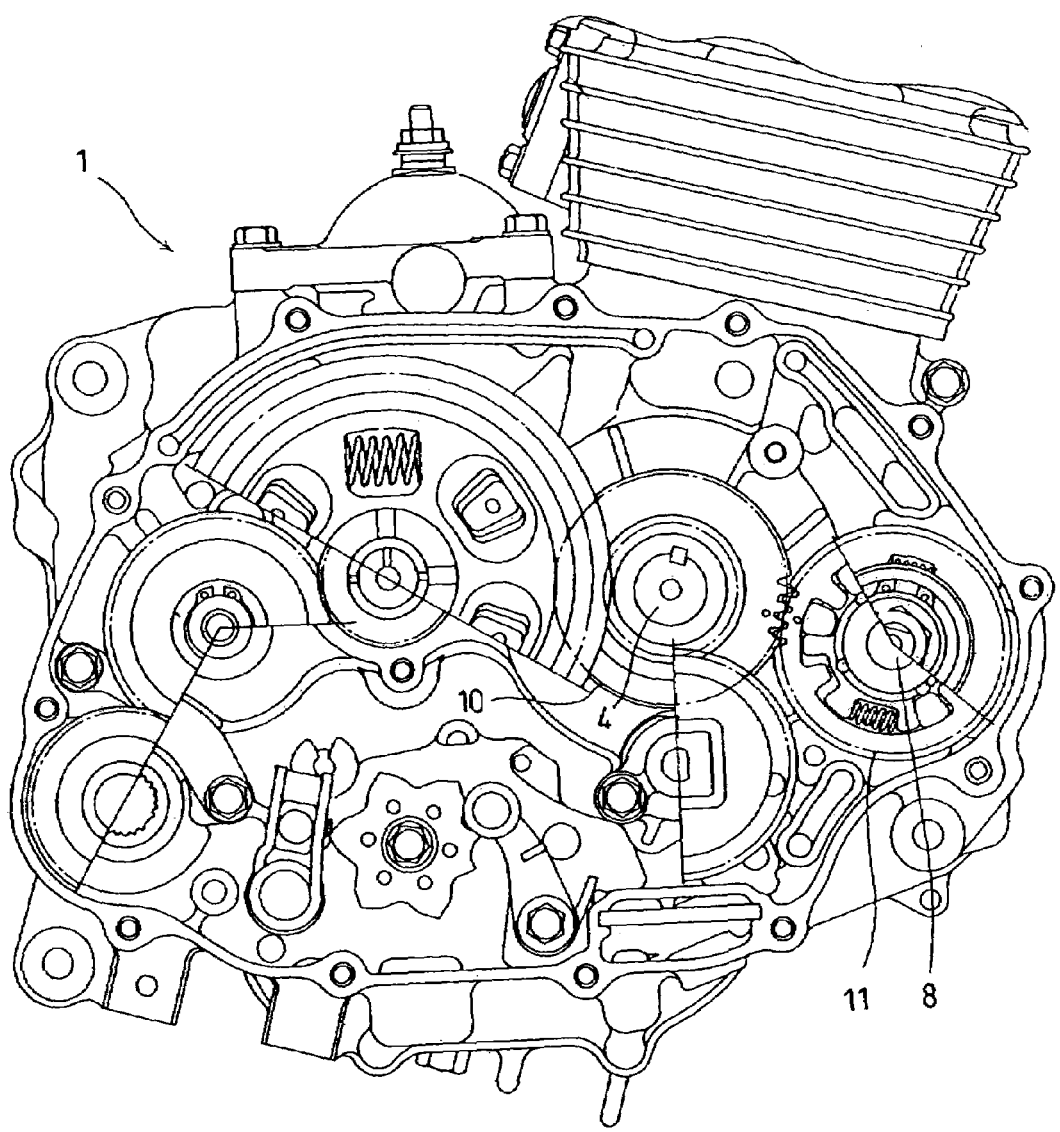
[FIG. 1]
Figure 2:
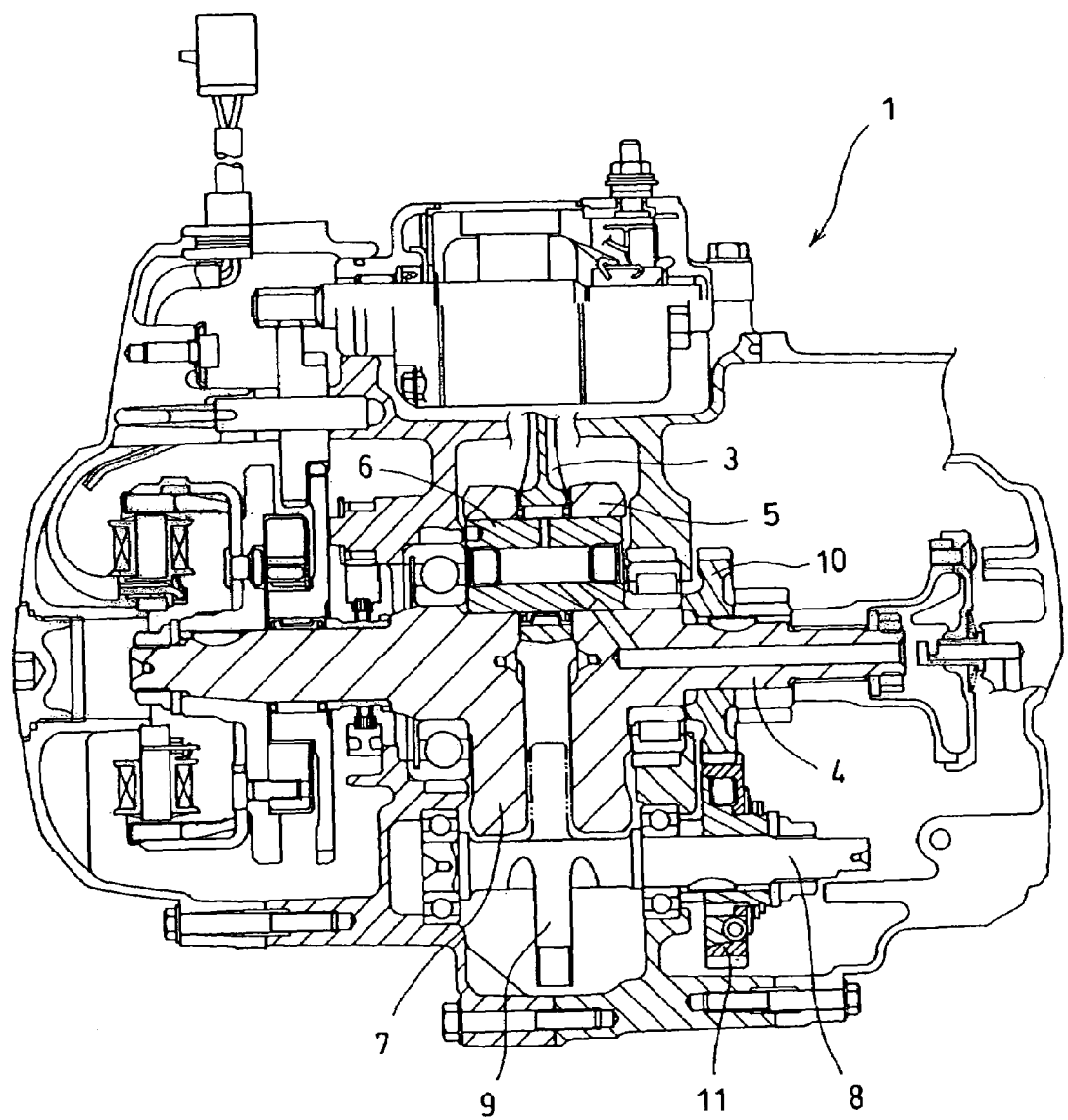
[FIG. 2]

FIG. 1 is a sectional view of a principal portion of an internal combustion engine 1 to which a balancer driven gear according to an embodiment of the present invention is applied. The principal portion is cut along a plane including a cylinder axis and intersecting a crankshaft perpendicularly. FIG. 2 is a sectional view of the engine principal portion as cut along a plane including the axes of the crankshaft and a balancer shaft.

In these figures, the numeral 3 denotes a connecting rod, and numeral 4 denotes a crankshaft. An enlarged end portion of the connecting rod 3 is pivotally secured to a crankpin 6 provided in a web 5 of the crankshaft 4. The web 5 is integrally formed with a balancing weight 7 on the side opposite to the crankpin 6.

A balancer shaft 8 is disposed in adjacency to and in parallel or substantially parallel with the crankshaft 4, and a balancer weight 9 is provided on the balancer shaft 8. The crankshaft 4 and the balancer shaft 8 are drivingly connected with each other through a balancer driving gear 10 and a balancer driven gear 11. The balancer driving gear 10 is mounted on the crankshaft 4, and the balancer driven gear 11 is mounted on the balancer shaft 8 and meshes with the balancer driving gear 10.

The balancer driving gear 10 and the balancer driven gear 11 are the same in diameter and also in the number of teeth, so that the balancer shaft 8 rotates at the same angular velocity as the crankshaft 4 in synchronism with and in a direction opposite to the crankshaft 4.

The balancing weight 7 is mounted on the crankshaft 4 so as to be directed to the side opposite to a piston 2 with respect to the crankshaft 4 on the axis of the cylinder, when the piston is at its top dead center. The balancing weight 9 is mounted on the balancer shaft 8 so as to be directed in the same direction as the balancing weight 7 with respect to the balancer shaft 8, when the piston is in the above position. By rotation of the balancing weights 7 and 9 in mutually opposite directions together with the crankshaft 4 and the balancer shaft 8, respectively, an inertia force produced by the reciprocating masses of the piston 2, the connecting rod 3 and so on is offset.

Figure 6B:
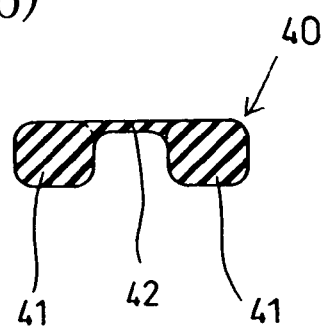
[FIG. 6(b)]
Figure 6C:
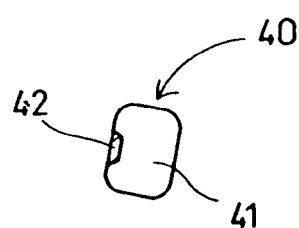
[FIG. 6(c)]
Figure 6A:
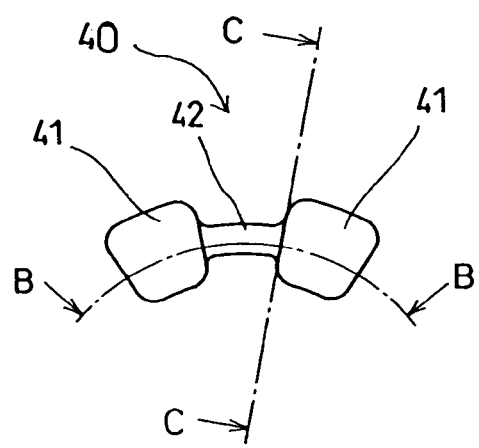
[FIG. 6(a)]

FIGS. 3(a) and 3(b) illustrate only the balancer driven gear 11 shown in FIGS. 1 and 2. FIGS. 4(a) to 6(c) illustrate component members of the balancer driven gear 11, of which FIGS. 4(a) to 4(c) illustrate a bush member 20, FIGS. 5(a) to 5(c) illustrate a gear member 30, and FIGS. 6(a) to 6(c) illustrate a damper rubber member 40.

First, FIG. 4(a) is a right side view of the bush member 20 as a component of the balancer driven gear 11, FIG. 4(b) is a sectional view as seen in the direction of arrow B-B in FIG. 4(a), FIG. 4(c) is a sectional view as seen in the direction of arrow C-C in FIG. 4(a), and FIG. 4(d) is a sectional view as seen in the direction of arrow D-D in FIG. 4(a).

The bush member 20 roughly includes a boss portion 21, which is fixed to the balancer shaft 8, and a disc portion 22 integral with the boss portion 21. A plurality of outward dowels 23a, 23b, 23c, 23d, 23e, and 23f project radially outward from the boss portion 21. Recesses (troughs) 24a and 24b are formed respectively between the outward dowels 23a and 23b and between the outward dowels 23d and 23e so as to be located on opposite sides with respect to the axis of the bush member. As shown, the recess 24a is deeper than the recess 24b. Two recesses 25 and 25 each for insertion therein of a damper rubber member 40 to be described later are formed respectively between the outward dowels 23b and 23c and between the outward dowels 23e and 23f so as to be located on opposite sides with respect to the axis. Further, two recesses 26 and 26 each for insertion therein of a spring damper 45 to be described later are formed respectively between the outward dowels 23c and 23d and between the outward dowels 23f and 23a so as to be located on opposite sides with respect to the axis. As shown in FIG. 4(d), both edges of each recess 26 are deeper than the central portion of the recess.

Next, FIG. 5(a) is a left side view of a gear member 30 as a component member of the balancer driven gear 11, FIG. 5(b) is a sectional view as seen in the direction of arrow B-B in FIG. 5(a), and FIG. 5(c) is a sectional view as seen in the direction of arrow C-C in FIG. 5(a).

The gear member 30 roughly includes an annular portion 31, which is disposed coaxially with the bush member 20 at the time of assembly, and a flange portion 32 integral with the annular portion 31. Gear teeth 31a are formed on an outer periphery of the annular portion 31. A plurality of inward dowels 33a, 33b, 33c, and 33d project radially inward from the inner periphery of the annular portion 31. Of these plural inward dowels, only the inward dowel 33c is shorter in projection length than the other inward dowels 33a, 33b, and 33d. Recesses 34a, 34b, 34a, and 34b are formed between adjoining inward dowels 33a, 33b, 33c, and 33d. Further, rectangular holes (windows) 35 and 35 to be described later, each for insertion therein of the spring damper 45, are formed at two positions of the flange portion 32.

FIG. 6(*a*) is a right side view of the damper rubber member 40 as a component of the balancer driven gear 11, FIG. 6(*b*) is a sectional view as seen in the direction of arrow B-B in FIG. 6(*a*), and FIG. 6(*c*) is a sectional view as seen in the direction of arrow C-C in FIG. 6(*a*). As shown in these figures, the damper rubber member 40 is constituted by an integrally molded combination of a pair of rubber blocks 41 as elastic blocks and a strip-like connecting portion 42 for connection between the rubber blocks 41.

FIG. 3(*a*) is a right-hand sectional view (a sectional view as seen in the direction of arrow A-A in FIG. 3(*b*)) of the balancer driven gear 11 constituted by assembling the bush member 20, gear member 30, and damper rubber member 40 of the above-described configurations. FIG. 3(*b*) is a sectional view as seen in the direction of arrow B-B in FIG. 3(*a*).

As shown in FIG. 3(*a*), the bush member 20 and the gear member 30 are disposed coaxially with each other. In the assembled state of the bush member 20 and the gear member 30, the inward dowel 33*a* of a large projection length on the gear member 30 is positioned in the deep recess (trough) 24*a* formed between the outward dowels 23*a* and 23*b* on the bush member 20. The inward dowel 33*c* of a small projection length is positioned in the shallow recess (trough) 24*b* formed between the outward dowels 23*d* and 23*e*. The inward dowels 33*b* and 33*d* on the gear member are positioned respectively in the recesses 25 formed between the outward dowels 23*b* and 23*c* and between the outward dowels 23*e* and 23*f* on the bush member. Two rubber blocks 41 and 41 connected through the connecting portion 42 are fitted in between the outward dowels 23*b* and 23*c* on the bush member side and the inward dowel 33*b* on the gear member side, and likewise two rubber blocks 41 and 41 connected through the connecting portion 42 are fitted in between the outward dowels 23*e* and 23*f* and the inward dowel 33*d*.

Further, the spring dampers 45 as elastic members are respectively fitted into two recesses 26 formed between the outward dowels 23*c* and 23*d* and between the outward dowels 23*f* and 23*a* so as to extend to the holes (windows) 35 and 35 formed on the gear member. As shown in FIG. 3(*b*), the balancer driven gear 11 thus constituted by the assembly of the bush member 20, gear member 30, damper rubber 40, and spring dampers 45 are fixed with washer 46, conical spring washer 47, washer 48, and C-shaped retaining ring 49, and the assembly thereof is completed.

In the balancer driven gear 11 of this embodiment, the boss portion 21 of the bush member 20 is fixed to the balancer shaft 8 of the balancer device. The gear teeth 31*a* of the gear member 30 are in mesh with the balancer driving gear 10 fixed onto the crankshaft 4. The rotation of the crankshaft 4 is transmitted to the balancer shaft 8 (see FIGS. 1 and 2). In this connection, the damper rubbers members 40 and 40 as elastic members are fitted in respectively between the outward dowels 23*b* and 23*c* on the bush member 20 and the inward dowel 33*b* on the gear member 30 and between the outward dowels 23*e* and 23*f* and the inward dowel 33*d*. Further, the spring dampers 45 and 45 as elastic members are fitted in from the recesses 26 and 26 formed in the bush member to the holes (windows) 35 and 35 formed on the gear member. Therefore, with deformation of these elastic members, vibrations or the like transmitted from the crankshaft 4 are damped to effect a smooth transfer of torque. The outward dowels 23*a*, . . . , 23*f* and the inward dowels 33*a*, . . . , 33*d* fulfill the function of stoppers for preventing an overstroke within the damper structure.

In this embodiment, the recesses (troughs) 24*a* and 24*b* are formed on opposite sides with respect to the axis of the bush member 20. In the assembled state of the balancer driven gear 11, as shown in FIG. 3(*a*), the inward dowels 33*a* and 33*c* of the gear member 30 are positioned within the recesses (troughs) 24*a* and 24*b*, respectively. However, in the bush member 20, the recess 24*b* is shallower than the recess 24*a*. In the gear member 30, the inward dowel 33*a* is larger in projection length than the inward dowel 33*c*. Therefore, when an assembling method other than the normal method is adopted, for example, if an attempt is made to effect assembly in a 180°-rotated state of the gear member 30 around the axis thereof relative to the bush member 20, the tip of the dowel 33*a*, which is large in projection length, comes into abutment against the bottom of the shallow recess (trough) 24*b* and cannot be properly inserted in the recess 24*b*. Thus, the dowel 33*a* cannot be satisfactorily received in its normal position. For this reason, it is possible to make the assembly in the right way while preventing erroneous assembly. Accordingly, the degree of freedom in the layout of the internal combustion engine is improved without being restricted by gear specifications.

Although in the above embodiment the dowels are varied in projection length and are made asymmetric in shape, the same effect as above can also be attained by changing the peripheral width of the dowels.

The invention claimed is:

1. A balancer driven gear of an engine comprising:
   a bush member having a boss portion adapted to be fixed to a balancer shaft and a plurality of unevenly spaced outward dowels projecting radially outwardly from an outer periphery of the boss portion;
   a gear member disposed coaxially with said bush member, said gear member having an annular portion with gear teeth formed on an outer periphery thereof and a plurality of inward dowels projecting radially inwardly from an inner periphery of the annular portion;
   said bush member and said gear member being assembled in such a manner that said outward and inward dowels are disposed alternately in a peripheral direction of the balancer driven gear; and
   elastic members respectively provided between selected outward dowels on the bush member and selected inward dowels on the gear member;
   wherein at least one of the shapes and dimensions of said outward and inward dowels are asymmetric with respect to an axis of the balancer driven gear.

2. The balancer driven gear of an engine according to claim 1 wherein:
   one of said outward dowels and the inward dowels have recesses between adjoining dowels;
   the other dowels are located in said recesses, respectively;
   two of said recesses positioned on opposite sides with respect to the axis of the balancer driven gear have mutually different depths; and
   the other dowels, disposed within said two opposite recesses of the mutually different depths, have mutually different heights.

3. The balancer driven gear of an engine according to claim 2 wherein:
   said one dowels are radially outwardly projecting dowels and said other dowels are radially inwardly projecting dowels.

4. The balancer driven gear of an engine according to claim 1, wherein some of said elastic members are interconnected by a web portion.

5. The balancer driven gear of an engine according to claim 1, wherein the annular portion of the gear member has two openings formed therein, and wherein the balancer driven gear further comprises a pair of spring dampers which respectively fit into the openings.

6. The balancer driven gear of an engine according to claim 5, wherein selected dowels of the bush member have spring-receiving recesses formed therebetween, and wherein the bush member and the gear member are respectively configured so that they can only be nestingly fitted together one way when the openings of the gear member are aligned with the spring-receiving recesses of the bush member.

7. The balancer driven gear of an engine according to claim 1, wherein some of the inward and dowels are disposed proximate one another without any elastic members therebetween.

8. A balancer driven gear of an engine, said balancer driven gear comprising:
a bush member having a boss portion fixed to a balancer shaft and a plurality of outward dowels projecting radially outwardly from an outer periphery of the boss portion;
a gear member disposed coaxially with said bush member, said gear member having an annular portion with gear teeth formed on an outer periphery thereof and a plurality of inward dowels projecting radially inwardly from an inner periphery of the annular portion;
said bush member and said gear member being assembled in such a manner that said outward and inward dowels are disposed alternately in a peripheral direction of the balancer driven gear; and
elastic members provided between selected outward dowels on the bush member and selected inward dowels on the gear member;
wherein at least one of the shapes and dimensions of said outward and inward dowels are asymmetric with respect to an axis of the balancer driven gear;
wherein one of said outward dowels and said inward dowels have recesses formed between adjoining dowels;
wherein the other dowels are located in said recesses, respectively;
wherein two of said recesses positioned on opposite sides with respect to the axis of the balancer driven gear have mutually different peripheral widths; and
wherein the other dowels, disposed within said two opposite recesses of the different depths, have mutually different peripheral widths.

9. The balancer driven gear of an engine according to claim 8 wherein:
said one dowels are radially outwardly projecting dowels and said other dowels are radially inwardly projecting dowels.

10. A balancer driven gear for an engine, said balancer gear comprising:
a bush member comprising:
a boss portion adapted to be affixed to a balancer shaft; and
a plurality of outward dowels projecting radially outwardly from an outer periphery of the boss portion, with respective recesses being formed between adjacent outward dowels;
a gear member disposed coaxially with said bush member, said gear member comprising:
an annular portion with gear teeth formed on an outer periphery thereof; and
a plurality of inward dowels projecting radially inwardly from an inner periphery of the annular portion, said inward dowels being spaced around the gear member so that they are aligned with selected recesses of the bush member;
said bush member and said gear member being nestingly intermeshed and assembled in such a manner that said outward and inward dowels are alternately disposed in a peripheral direction of the balancer driven gear; and
a plurality of elastic members selectively provided between selected outward dowels on the bush member and selected inward dowels on the gear member;
wherein two of said recesses positioned on opposite sides with respect to the axis of the balancer driven gear have mutually different depths; and
wherein two of the inward dowels, respectively disposed within said two opposite recesses, have mutually different heights.

11. The balancer driven gear of an engine according to claim 10, wherein some of said elastic members are interconnected by a web portion.

12. The balancer driven gear of an engine according to claim 10, wherein the flange portion of the gear member has two openings formed therein, and wherein the balancer driven gear further comprises a pair of spring dampers which respectively fit into the openings.

13. The balancer driven gear of an engine according to claim 12, wherein selected dowels of the bush member have spring-receiving recesses formed therebetween, and wherein the bush member and the gear member are respectively configured so that they can only be nestingly fitted together one way when the openings of the gear member are aligned with the spring-receiving recesses of the bush member.

14. The balancer driven gear of an engine according to claim 10, wherein some of the inward and dowels are disposed proximate one another without any elastic members therebetween.

* * * * *